(12) United States Patent
Gauthier et al.

(10) Patent No.: US 7,179,538 B2
(45) Date of Patent: Feb. 20, 2007

(54) FLEXIBLE LEATHER LAMINATE

(75) Inventors: Sylvie Gauthier, Shelton, CT (US); George Tsangarides, Meriden, CT (US)

(73) Assignee: Panolam Industries International, Inc., Shelton, CT (US)

( * ) Notice: Subject to any disclaimer, the term of this patent is extended or adjusted under 35 U.S.C. 154(b) by 285 days.

(21) Appl. No.: 10/762,102

(22) Filed: Jan. 20, 2004

(65) Prior Publication Data

US 2004/0151852 A1    Aug. 5, 2004

Related U.S. Application Data

(60) Provisional application No. 60/441,890, filed on Jan. 22, 2003.

(51) Int. Cl.
- B32B 9/02 (2006.01)
- B32B 9/04 (2006.01)
- B32B 9/06 (2006.01)
- B32B 27/06 (2006.01)
- B32B 27/36 (2006.01)

(52) U.S. Cl. ............... 428/473; 428/480; 428/311.11; 442/152; 442/153; 442/164; 442/165; 442/268; 442/277; 442/281; 442/286; 442/287; 442/294; 442/295

(58) Field of Classification Search ............ None
See application file for complete search history.

(56) References Cited

U.S. PATENT DOCUMENTS

| | | | | | |
|---|---|---|---|---|---|
| 1,928,606 A | * | 9/1933 | Sweany | ................ | 12/146 BP |
| 2,132,399 A | * | 10/1938 | Cooper | ................ | 428/198 |
| 2,622,991 A | * | 12/1952 | Sturm | ................ | 427/256 |
| 3,391,056 A | * | 7/1968 | Robinson, Jr. | ................ | 442/65 |
| 3,398,042 A | * | 8/1968 | Odenthal et al. | ........ | 428/423.4 |
| 3,475,267 A | | 10/1969 | Miles | ................ | 161/203 |
| 3,698,978 A | * | 10/1972 | McQuade | ............ | 156/219 |
| 3,700,537 A | * | 10/1972 | Scher | ................ | 428/138 |
| 3,745,041 A | * | 7/1973 | Raymond | ............. | 427/358 |
| 3,794,544 A | * | 2/1974 | Eckert et al. | ........... | 156/230 |
| 3,930,921 A | * | 1/1976 | Connett | ................ | 156/234 |
| 4,154,882 A | | 5/1979 | Ungar et al. | .......... | 428/165 |
| 4,218,505 A | * | 8/1980 | Shiga et al. | ........... | 428/313.9 |
| 4,255,480 A | * | 3/1981 | Scher et al. | ........... | 428/208 |
| 4,297,408 A | | 10/1981 | Stead et al. | .......... | 428/240 |
| 4,311,748 A | | 1/1982 | Casey et al. | .......... | 428/204 |
| 4,473,613 A | | 9/1984 | Jaisle et al. | .......... | 428/220 |
| 4,695,508 A | * | 9/1987 | Kageyama et al. | ..... | 442/149 |
| 4,834,762 A | * | 5/1989 | Nishibori | ............. | 8/94.1 R |
| 4,864,790 A | | 9/1989 | Liardet | ................ | 52/311 |
| 4,874,449 A | * | 10/1989 | Schaefer et al. | ....... | 156/246 |
| 4,880,689 A | | 11/1989 | Park et al. | ............. | 428/143 |
| 5,344,692 A | * | 9/1994 | Schmoock | ............. | 428/161 |

(Continued)

FOREIGN PATENT DOCUMENTS

DE          3433108        * 3/1986

(Continued)

Primary Examiner—Vivian Chen
(74) Attorney, Agent, or Firm—O'Shea, Getz & Kosakowski, P.C.

(57) ABSTRACT

A heat and pressure consolidated flexible laminate, and a method for producing the same, is provided that includes in superimposed relationship, a flexible, resin coated backing layer consisting of one or more sheets, a decorative layer consisting essentially of a leather material and, optionally, an overlay.

5 Claims, 1 Drawing Sheet

U.S. PATENT DOCUMENTS

| | | | |
|---|---|---|---|
| 5,534,327 A | * | 7/1996 | Nishi et al. ................. 428/151 |
| 5,609,941 A | * | 3/1997 | Cawthon .................... 428/172 |
| 5,762,742 A | * | 6/1998 | Maitan et al. .............. 156/219 |
| 5,932,056 A | * | 8/1999 | Mark et al. ................. 156/266 |
| 6,099,938 A | * | 8/2000 | Stoyanovich ............... 428/151 |
| 6,395,408 B1 | | 5/2002 | Nelson et al. .............. 428/690 |
| 2004/0151927 A1 | * | 8/2004 | Gauthier et al. ............ 428/473 |
| 2004/0151936 A1 | * | 8/2004 | Gauthier et al. ............ 428/540 |

FOREIGN PATENT DOCUMENTS

| | | |
|---|---|---|
| DE | 44 47 171 A1 | 7/1996 |
| ZA | 9000623 * | 11/1990 |

* cited by examiner

FLEXIBLE LEATHER LAMINATE

This application claims the benefit of and priority from U.S. Provisional Patent Application Ser. No. 60/441,890, filed 22 Jan. 2003, which is hereby incorporated by reference in its entirety.

BACKGROUND OF THE INVENTION

1. Field of the Invention

The present invention relates to decorative laminates in general and, more particularly to flexible laminates, also known as a profile wrapping, having a leather material as a decorative layer. In addition, the present invention relates to a method for manufacturing the same.

2. Background Information

Decorative laminates are often used in the construction of cabinetry, furniture, and other building products. There is considerable consumer demand for flexible, decorative laminates in a wide variety of colors, patterns, and textures. Furthermore, flexible laminates capable of tightly fitting the contours, or three-dimensional features of underlying substrates are also highly desirable. These "profile wrappers" allow one to seamlessly cover a substrate with a single piece of material.

Leather is generally perceived as a quality material used in high-end applications. Unfortunately, leather and other natural skins can be difficult to work with because of size limitations, shrinkage, imperfections, uneven stretching, etc. It would be useful, therefore, to provide a product that facilitates the incorporation of leather and other natural skins into a flexible laminate having the ability to "profile wrap" around substrates having two- and three-dimensional features found in applications such as furniture, crown molding, cabinetry, picture frames, and the like.

DISCLOSURE OF THE INVENTION

According to the present invention, a heat and pressure consolidated flexible laminate is provided that comprises, in superimposed relationship, a flexible, resin coated backing layer consisting of one or more sheets, a decorative layer consisting essentially of a leather material and, optionally, an overlay.

Historically, leather clad panels used in furniture often required the furniture maker to stretch, cut and/or fold the leather skin to fit the two- or three-dimensional features of an article. In some applications it was necessary to attach the edges of the skin to the panel's underside prior to attaching the panel to a substrate. In other instances, it was necessary to apply an adhesive to the leather and/or the substrate. Sufficient shrinkage in some instances would cause the skin to pull away from the underside of the panel, become detached from the substrate, or tear. Leather is known for being difficult to work with because it stretches, and shrinks, unevenly.

An advantage of the present flexible laminate is that it provides a leather-surfaced laminate capable of wrapping the profile of a substrate having two- or three-dimensional features. Because the leather decorative layer is an integral part of the laminate, there is no need to fit, or adhere, the leather to the panel or substrate. The present flexible laminate can be attached to a substrate in a variety of ways. If necessary, the present flexible laminate can also be trimmed like other laminates. In short, the present flexible leather laminate provides a product that can reduce or eliminate many of the problems usually associated with using leather in framing, furniture making, and the like.

Another advantage of the present flexible leather laminate is that, in most embodiments, it retains the smell of natural leather. Some leather or leather-like products used in furniture and cabinetry applications look like leather, but very few retain the desirable smell of leather. The fact that the present laminate retains the natural leather smells provides it with a definite commercial feature.

These and other objects, features, and advantages of the present invention will become apparent in light of the drawings and detailed description of the present invention provided below.

DETAILED DESCRIPTION OF THE INVENTION

Figure 1:
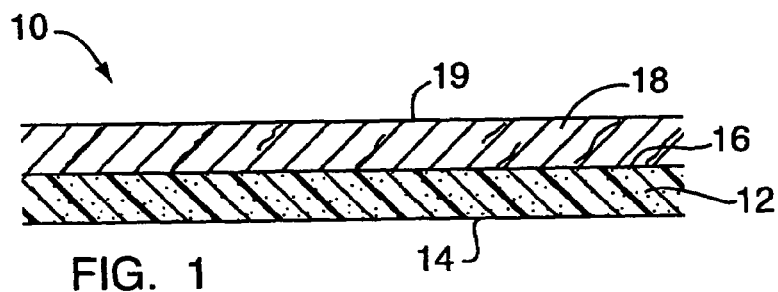
FIG. 1 is a cross sectional view of the superimposed constituent layers of the present flexible leather laminate.
Figure 2:
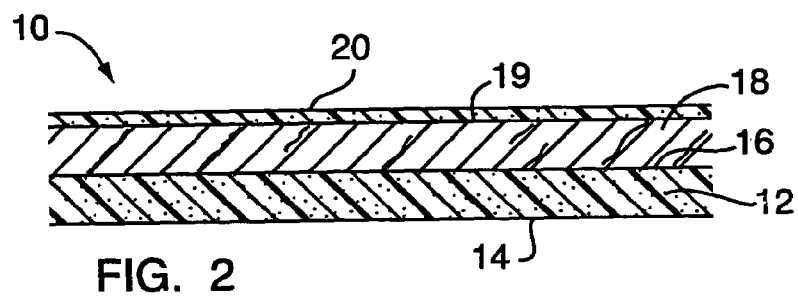
FIG. 2 is a cross sectional view of the present flexible leather laminate shown in FIG. 1 having an overlay layer added thereon.

Now referring to FIG. 1, the flexible leather laminate of the present invention is generally represented by reference numeral 10. The leather laminate includes a flexible backing layer 12 having a first side 14 and a second side 16, and a decorative layer 18 consisting essentially of a leather material bonded to the first side 14 of the flexible backing layer 12. Superimposing the decorative layer 18 onto the backing layer 12 defines a free side 19 of the decorative layer 18. Additionally, the present invention may also have an overlay 20 (as shown in FIG. 2) bonded to the free side 19 of the decorative layer 18.

The term flexible as used herein to describe the various layers of the present invention is intended to mean that the materials remain substantially flaccid, and have the ability to be conformed to two- or three-dimensional features in a substantially uniform fashion. The flexible backing layer 12 is comprised of a sheet coated with a resin that remains substantially flexible. The sheet typically consists of a cellulosic material. In a preferred embodiment of the present invention, the backing layer 12 is coated with a polyester-based resin. Polyester-based resins, referred to herein also as "polyester resins," are well known in the art and are commercially available. The various properties of polyester resins will not be described in further detail other than to say that the specific parameters of the polyester resin will likely be chosen to accommodate the application at hand.

In another embodiment of the present invention, the backing layer 12 described above may be substituted with a commercially available backer product sold by Kimberly Clark®.

The decorative layer 18 includes a leather material. The "leather" referred to herein is a material comprised of an animal hide and is not limited to any particular type of animal. Preferably, the leather material is a bonded leather. The term "bonded leather" as used herein refers to a leather product that comprises leather shavings made from scrap and/or recycled leather. The shavings are processed into a sheet product using bonding agents to produce the bonded leather. Because bonded leather is commercially available, it will not be further described herein. A leather sheet thickness in the range of about 0.2 mm to about 4.0 mm is acceptable for most applications. A sheet thickness of about 0.2 mm to about 0.8 mm has particular utility.

In some embodiments, and now referring to FIG. 2, the present, flexible leather laminate further includes an overlay layer 20 disposed on the free side 19 of the decorative leather layer 18. The overlay layer 20 may, for example, consist of one or more sheets of high-quality alpha cellulose paper impregnated with a resin that remains substantially flexible after curing. The alpha-cellulose paper acts as a translucent carrier for the resin, imparts strength to the resin, facilitates maintaining a uniform resin thickness, and provides additional abrasion resistance to the leather layer 18.

A first process of manufacturing the present flexible laminate 10 involves stacking the flexible backing layer 12, the decorative leather layer 18, and, optionally, the overlay layer 20, in a superimposed relationship (i.e., a "build-up") between steel plates. The build-up is then subjected to a predetermined pressure and temperature for a time sufficient to consolidate the respective layers.

A second process for manufacturing the present flexible leather laminate involves dispensing the backing layer 12 and the decorative layer 18 (and the overlay layer 20, if used) in the aforesaid superimposed relationship upstream of a continuous press. The press is set up to create the temperature and pressure environment required to bond the layers into the finished laminate product. The line speed of the continuous press is chosen to create a dwell time within the press that is adequate to ensure sufficient bonding of the various layers. A release sheet is disposed on each side of the build-up prior to entering the press. The release sheet contiguous with the leather decorative layer is typically textured to impart an embossed texture to the laminate. The release sheets are typically drawn off after the laminate exits the press, and rolled for further handling. The leather laminate continues onto downstream handling equipment (e.g., equipment that winds the continuous laminate product into rolls and handling equipment for the rolls). The continuous press is advantageous because it decreases the processing time of the laminate.

In both manufacturing processes, the elevated temperature and pressure actually cause the resins within the backing material 12 and, if used, the overlay 20, to flow between the layers and bond with the leather decorative sheet 18 consolidating the various layers 12,18, (and optionally 20) into the integral flexible laminate 10. The present leather laminate is typically processed at a temperature in the range from about 110° C. to about 250° C., and at a pressure within the range of about 100 psi to about 1400 psi.

Figure 3:
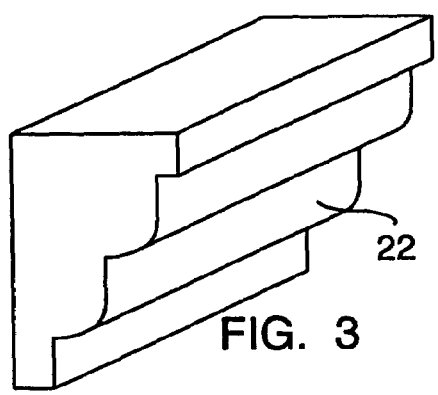
FIG. 3 is a substrate having a two-dimensional feature.
Figure 4:
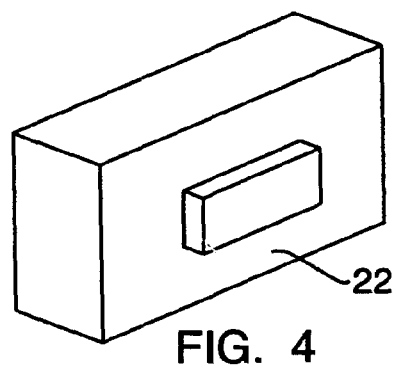
FIG. 4 is a substrate having a three-dimensional feature.
Figure 3A:
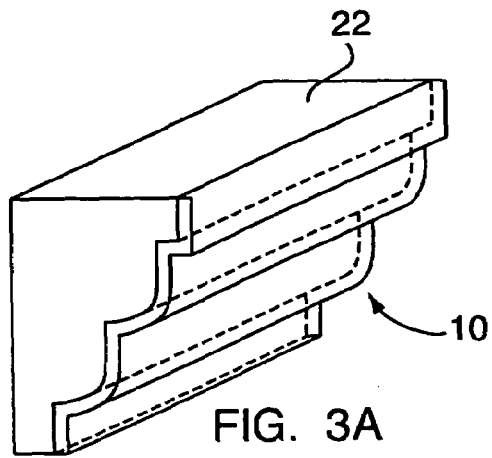
FIG. 3A is the present flexible leather laminate shown in FIG. 1, formed to closely fit the substrate of FIG. 3 (shown in dashed lines)
Figure 4A:
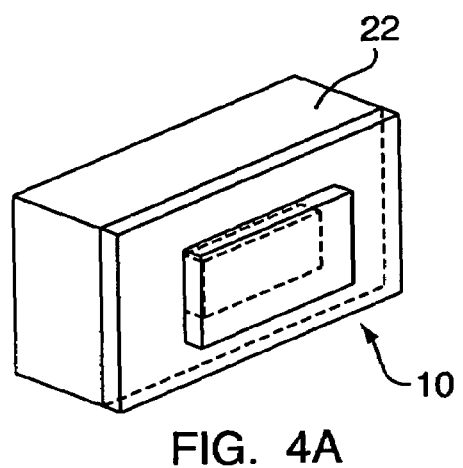
FIG. 4A is the present flexible leather laminate shown in FIG. 1, formed to closely fit the substrate of FIG. 4 (shown in dashed lines)

The present flexible laminate 10, described above, is designed to be affixed to a substrate. Now referring to FIG. 3, substrate 22 is a piece of "crown molding" having a two-dimensional feature. As shown in FIG. 4, substrate 22 can also have a three-dimensional feature(s). Typically, the flexible leather laminate 10 of either FIGS. 1 or 2 is thermally bonded, or otherwise adhered, to the substrate 22. In most instances, pressure is applied to the flexible leather laminate 10 to ensure a uniform fit between the present flexible leather laminate and the features of the substrate 22.

The following examples are illustrative of the present flexible leather laminate and do not constitute any limitation with regard to the subject matter of the invention:

EXAMPLE I

A single flexible leather laminate is manufactured using a non-continuous press. A build-up consisting of a release sheet, a backing layer 12, a decorative leather layer 18, and a textured release sheet is made in a superimposed relationship and placed between steel plates. The build-up is then subjected to a pressure of about 300 PSI. Once the predetermined pressure is reached, the press is heated to a predetermined temperature of about 150° C. The press is held at the predetermined pressure and temperature for a heating cycle of about 60 seconds. The pressure is then released and the build-up, which is now a flexible leather laminate, is removed from the press without an extended cooling period. The release sheets are removed and the completed flexible leather laminate is stacked.

EXAMPLE II

A single flexible leather laminate is manufactured using a GreCon continuous high pressure laminating press, which includes an inlet section, a heating section and a cooling section. The temperature of each section is controlled independently. The total amount of heat imparted to the layers of the build-up is controlled by the temperature of the different sections and the dwell time, which is dependent on the line speed. This continuous process requires that all of the various layers used to manufacture the laminate be fed into the press as continuous webs. A roll of backing layer 12 approximately 4.5 mils thick and a roll of the decorative leather sheet 18 approximately 0.6 mm thick are situated upstream of the continuous press in a manner enabling them to continuously enter the press in the aforesaid superimposed relationship. Rolls of release sheet are situated upstream of the continuous press in such a manner to continuously supply a release sheet to the outer surfaces of the aforesaid build-up. The release sheet contiguous with the leather decorative layer is textured to impart an embossed texture to the laminate in the present example. The temperature settings of the different press sections are as follows: the inlet section is set at 90° C., the heating section is 135° C., and the cooling section is 115° C. The pressure is set at 200 psi. The line speed of the continuous press is set at 60 ft/min to create a dwell time within the press of approximately 5 seconds. As the laminate exits the press, the release sheets are drawn off and rolled for further handling. The flexible leather laminate is wound into rolls.

It will be obvious to those skilled in the art that various changes may be made without departing from the scope of the present invention and that the invention is not to be considered limited to what is described and exemplified in the specification.

What is claimed is:

1. A flexible heat and pressure consolidated laminate, comprising in superimposed relationship:
   a flexible backing layer containing a polyester impregnated sheet;
   a decorative layer consisting essentially of a leather material;
   a flexible overlay bonded to said decorative layer, consisting of at least one sheet of alpha cellulose paper impregnated with a resin that remains flexible after curing;

wherein said layers have been exposed, simultaneously, to temperature between 110° C. and 250° C. and pressure between 100 PSI and 450 PSI.

2. A flexible heat and pressure consolidated laminate, comprising in superimposed relationship:
- a flexible backing layer containing a polyester impregnated sheet;
- a decorative layer consisting essentially of a leather material, said leather material is bonded leather with a sheet thickness in the range of from about 0.2 mm to about 4 mm; and
- a flexible overlay bonded to said decorative layer, said flexible overlay consists of at least one sheet of alpha cellulose paper impregnated with a resin that remains substantially flexible after curing;

wherein said layers have been exposed, simultaneously, to temperature between 110° C. and 250° C. and pressure between 100 PSI and 450 PSI.

3. A heat and pressure consolidated laminate, comprising in superimposed relationship:
- a flexible backing layer containing a polyester impregnated sheet;
- a decorative layer consisting essentially of a leather material; and
- a flexible overlay bonded to said decorative layer, said flexible overlay consists of at least one sheet of alpha cellulose paper impregnated with a resin that remains flexible after curing.

4. The laminate of claim 3, wherein the flexible backing layer comprises a cellulosic material.

5. The laminate of claim 3, wherein the decorative layer consists essentially of bonded leather.

* * * * *